TELEGRAPH SWITCHING SYSTEM

Filed Jan. 20, 1945 3 Sheets-Sheet 1

INVENTORS
W. B. BLANTON
E. J. AGNEW
BY M. R. Marsh
ATTORNEY

TELEGRAPH SWITCHING SYSTEM

INVENTORS
W. B. BLANTON
E. J. AGNEW
BY M. R. Marsh
ATTORNEY

June 27, 1950 W. B. BLANTON ET AL 2,512,605

TELEGRAPH SWITCHING SYSTEM

Filed Jan. 20, 1945 3 Sheets-Sheet 3

INVENTORS
W. B. BLANTON
E. J. AGNEW
BY M. R. Marsh
ATTORNEY

Patented June 27, 1950 2,512,605

UNITED STATES PATENT OFFICE 2,512,605

TELEGRAPH SWITCHING SYSTEM

William B. Blanton, Rockville Centre, and Edward J. Agnew, Brooklyn, N. Y., assignors to The Western Union Telegraph Company, New York, N. Y., a corporation of New York Application January 20, 1945, Serial No. 573,750

12 Claims. (Cl. 178—3)

This invention relates to telegraph switching systems, and more particularly to so-called telegraph reperforator switching systems and apparatus wherein reperforating equipment is employed to store signals in a storage medium such as a tape which is subsequently employed to control a tape transmitter to effect transmission of the stored signals to a sending circuit.

A feature of the invention resides in the provision of means whereby a single transmitter normally effective to transmit signals stored in its control tape to but a single circuit is conditioned to effect transmission of the signals stored in its tape to a plurality of circuits.

Another feature of the invention resides in the arrangement whereby a manually operable means normally operative to condition a single transmitter for transmission of the same message to a plurality of circuits may be arranged to condition the transmission of the message to less than the total number of said plurality of circuits. In this connection a further feature of the invention resides in the provision of means to connect groups of sending circuits to the system for transmission of the single message.

A further feature of the invention is the arrangement whereby the individual signal impulses of code groups of a message are transmitted to selected ones of a plurality of circuits independently within a predetermined time interval but not necessarily simultaneously. In this connection another feature is the arrangement whereby the transmission of a second code group of impulses to a plurality of sending circuits is not initiated until the completion of the independent transmission of the preceding code group to all such circuits.

Another feature of the invention is the provision of means whereby certain types of failure of a signal responsive means at the receiving end of any one or more of the connected circuits which is normally effective to stop further transmission thereto conditions the system to continue transmission to the other ones of the connected circuits.

Figure 1:
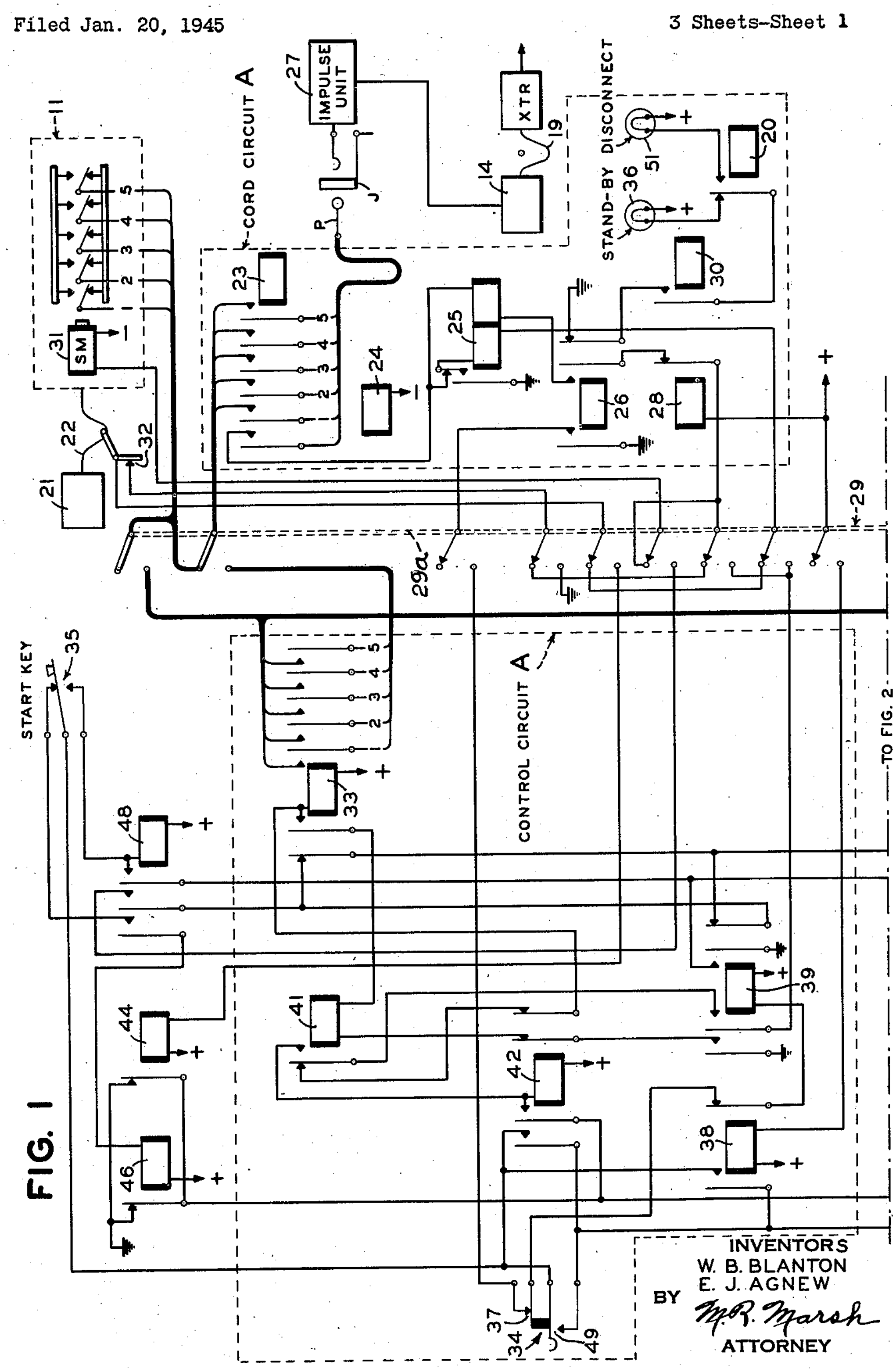
Figure 2:
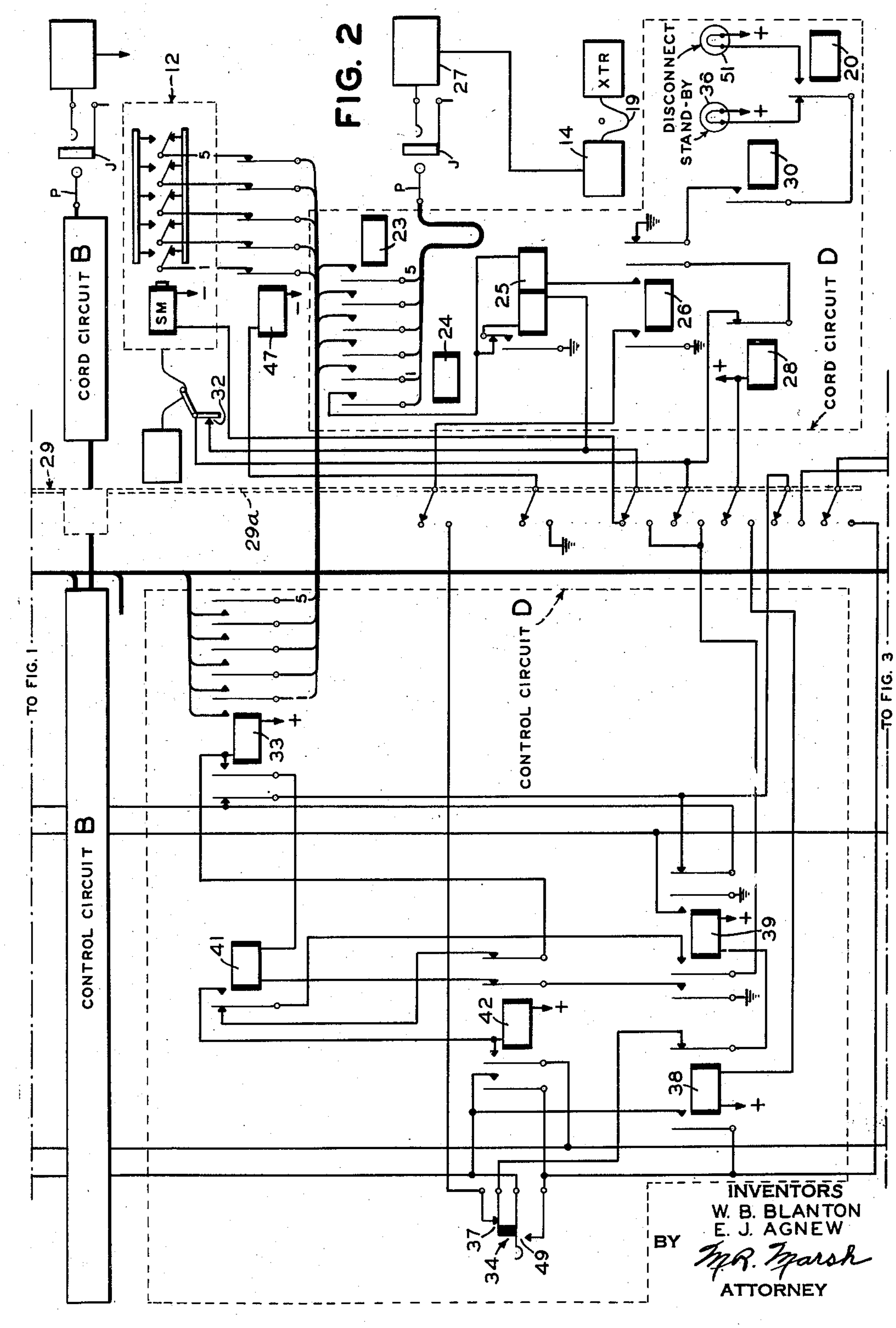
Figure 3:
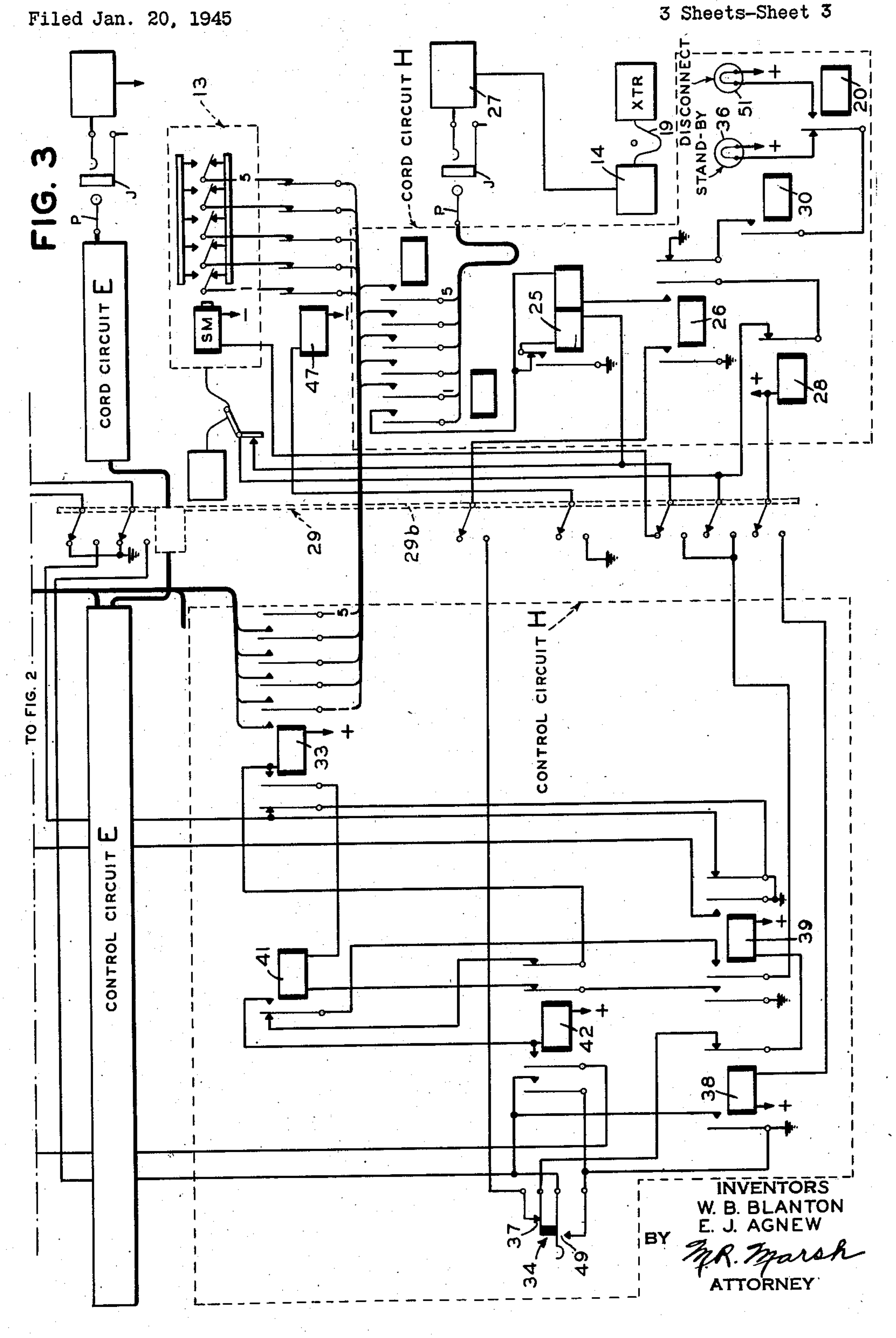

The above and further features of the invention will be more apparent in the following detailed description of a preferred embodiment thereof shown in the accompanying drawings, wherein:

Figs. 1, 2 and 3, taken together, illustrate diagrammatically the invention as it may be applied to a reperforator switching system.

The invention is shown and described herein as it may be applied to a reperforator switching system of the general type disclosed in the patent to Blanton No. 2,279,295, dated April 14, 1942, and provides means whereby any one of the tape transmitters such as, for example, those represented by the reference numeral TT associated with plugs P, Fig. 1, of the said patent may be adapted to transmit to a plurality of circuits such as those extending away from jacks 14 to 21 to signal responsive means such as reperforators RR4 to RR9. Although the circuits extending away from jacks 14 to 21 of Fig. 1 of the Blanton patent are shown as intra-office circuits, they ultimately extend to a remote office and such circuits for the purpose of this description are termed sending circuits.

Referring to the drawings, a plurality of tape controlled transmitters 11, 12 and 13 are shown with associated cord circuits A, D and H which terminate in plugs P. The plugs P may be inserted in any one of a number of associated jacks such as J, only one of which is shown associated with each plug, in the manner fully set forth in the above-mentioned Blanton patent whereby signals from the transmitters such as 11 to 13 may be transmitted to reperforators such as 14. These reperforators prepare second tapes 19 which in turn control associated transmitters to effect transmission of representative signals to sending circuits. The reperforators 14 with their associated tapes 19 and transmitters constitute in effect relaying means whereby a plurality of messages may be stored for transmission to a sending circuit.

Printer-perforators such as 21 of the well known type, one of which is associated with each cord circuit, prepare tapes 22 in accordance with received signals which are employed to control associated transmitters such as 11, 12 and 13. The attendant on noting the destination of the message appearing in the tape 22 inserts the associated plug P in the appropriate jack J whereupon transmission of such a message is begun as soon as or if the circuit extending from the jack J is idle.

In accordance with the invention, a message appearing in one of the tapes 22 may be transmitted through a plurality of jacks J to a corresponding number of circuits. A message destined for a plurality of different destinations is called a "book message" and a transmitter adapted to transmit to a plurality of circuits is called a "book transmitter". In the drawing the transmitter 11 is the "book" transmitter and while, in the manner set forth hereinafter, it may be arranged to transmit to a plurality of circuits, it through its associated cord circuit and plug P may transmit to but a single circuit in the usual manner as set forth in the Blanton patent. In accordance with the invention a control circuit is associated with each cord circuit of the group to which a single "book" message may be transmitted and these control circuits are represented in the drawings by reference letters corresponding to respective cord circuits.

When the cord circuits are operated in the usual manner, that is, when a transmitter such as 11 is transmitting through its cord circuit and plug P to only one selected jack J, relays 20, 23, 24, 25, 26 and 30 of the present drawings functionally operate in substantially the same manner as relays 82, 121, 122, 123, 81 and 76, respectively, of Fig. 2 of the above-mentioned Blanton patent. During these times the character representing code groups from the transmitter in conjunction with an impulse unit such as 27 in the connected jack circuit, control the reperforator 14 to perforate a tape 19 which subsequently is employed to control a transmitter to effect transmission of the stored signals to a remote office. The cord circuit shown in the accompanying drawings include a tape tie-up relay 28 which is adapted to be operated on the failure of the tape 19 to properly feed through the reperforator 14. The circuit to the tape tie-up relay 28 of each cord circuit may be controlled from a pair of contacts such as 141, Fig. 14, of a patent to R. Hoover, No. 2,252,852, granted August 19, 1941, which patent also discloses a reperforator which may be employed as the reperforator represented by reference numeral 14 herein. During these normal periods of operation of the cord circuits the above-mentioned control circuits, one for each cord circuit, are unoperative and have no effect over their associated cord circuits.

The control circuits are arranged to be associated with their cord circuits to operate in conjunction therewith through the operation of a multi-contact manual switch represented generally by reference numeral 29. The switch 29 is divided into two parts 29*a* and 29*b* and by operating the first or upper part 29*a* which includes that part of the switch shown in Figs. 1 and 2 from its normal or "regular" position, such as that shown in the drawings, to its "book" position where the switch arms will contact the lower one of their two associated contacts, circuits are established whereby the "book" transmiter 11 is conditioned to transmit to a first group of cord circuits and sending circuits to which their plugs may be connected. By throwing the second or lower part 29*b*, Fig. 3, of the switch 29 to its "book" position, another group of cord circuits are conditioned to have signals from the "book" transmitter 11 transmitted therethrough. In the embodiment of the invention shown in the drawings the first and second parts 29*a* and 29*b* respectively of switch 29 control four cord circuits each and by throwing the first part 29*a* of switch 29 to its "book" position, signals from thransmitter 11 may be transmitted through three other cord circuits in addition to its associated cord circuit A. The operation of the lower part 29*b* of switch 29 from its "regular" to its "book" position connects four more cord circuits to the "book" transmitter 11. Each control circuit for a cord circuit has a so-called cut-out switch whereby any one of the cord circuits connected to the "book" transmitter 11 through operation of switch 29 may be effectively disconnected therefrom so that signals transmitted from the "book" transmitter will not be extended through the cord circuits associated with operated cut-out keys.

The impulse unit 27 of a jack circuit in addition to pulsing the intelligence impulses from the transmitter, such as 11, of a connected cord circuit, such as A, generates the so-called step pulse which effects periodic energization of the step magnet 31 of the transmitter to effect advancement of the tape in conjunction with each code group of impulses transmitted. As described and shown in the Blanton patent, the step pulse after passing through contacts of certain relays in the cord circuit, normally divides and passes through both coils of an auto-control relay and thence through parallel paths to the step magnet SM. One of the parallel paths has therein a set of tape lever contacts which open on taut tape to "lock up" the transmitter. The same general arrangement is employed in the cord circuits in the accompanying drawings and the step pulse, with the switch 29 in its "regular" position, also passes through various switch arms of the upper 29*a* of switch 29. The tape lever contacts 32, when opened by taut tape, "lock up" associated transmitter 11. Accordingly the control of the advancement of the tape through the transmitter 11 with the switch 29 in its "regular" position is in all substantial respects similar to that described in the Blanton patent with reference to Fig. 2.

With the upper part 29*a* of switch 29 in its "regular" position, the individual circuits from the tongues of the transmitter 11 extend through the switch 29 to front contacts of a relay 23, and with relay 23 energized, these individual circuits are extended to the plug P. When the upper part 29*a* of switch 29 is thrown to its "book" position, the tongues of transmitter 11 are extended over individual circuits to front contacts of relays 33 in each of the control circuits such as A to H. The associated tongues of relay 33 of control circuit A are connected by individual circuits through the upper part 29*a* of switch 29 in its "book" position to the front contacts of relay 23 of cord circuit A while the tongues of relays 33 of other control circuits are connected directly to front contacts of relays 23 of respective cord circuits. Assume that a message appears in tape 22 associated with the "book' transmitter 11, that is destined for a number of different destinations. If, for example, the "book" message is to be transmitted over six different sending circuits, the operator will move both parts 29*a* and 29*b* of the switch 29 from "regular" to "book" position whereas if the message is to be transmitted over four circuits, only one part of the switch, the upper part 29*a*, need be moved. Since it is assumed the "book" message is to be transmitted to six circuits, the operator after throwing the upper and lower sections 29*a* and 29*b* of the switch 29 to their "book" position will operate cut-out switches, such as 34, of two control circuits and then insert the plugs P of the cord circuits associated with unoperated cut-out switch into jacks, such as J, assigned to the desired outgoing circuits.

A relay 30 is included in each cord circuit and operates in the manner set forth in the Blanton patent when its associated plug, such as P, is inserted in a jack J. If it is asumed that the associated cord circuit is idle at the time of the plugging operation, the energization of relay 30 as a result of the plugging operation completes an obvious circuit through a back contact of relay 26, a front contact of relay 30 and a back contact of relay 20 for the illumination of a lamp 36. The illumination of this lamp indicates to the operator that the associated cord circuit is in condition for operation and it will remain illuminated until the connected jack circuit is seized by the operation of relay 26. Lamp 36 is called a standby lamp.

If the six plugs P are plugged up to idle jack circuits, all standby lamps 36 in the associated cord circuits will be illuminated and as the seize relays 26 operate, these lamps will go out. The operation of a seize relay may be delayed because of the associated cord circuit being plugged up to a busy jack circuit, since the jacks J may be multipled to a plurality of positions. When all the standby lamps 36 associated with the plugged up cord circuits are extinguished, the operator momentarily operates the start key 35 and in the manner set forth hereinafter transmission of the message in the tape of the "book" transmitter 11 to the plurality of sending circuits begins.

Relays 20 and 26 operate when a sending circuit is seized and the operation of a relay 26 of a cord circuit applies a ground through a contact of switch 29, the closed contacts 37 of cut-out key 34 of the associated control circuit, the right hand tongue and back contact of a relay 38 and through the coil of a relay 39 to the positive potential, thus effecting energization of relay 39. In the same manner, relays 39 of the other control circuits associated with unoperated cut-out keys 34 are energized as the sending circuits to which associated cord circuits are plugged become idle. The energization of a relay 39 completes a circuit for the step pulse from a front contact of relay 23 of the associated cord circuit, through the right hand coil of relay 25, a make contact and tongue of relay 26, a back contact and tongue of relay 28, a switch arm and contact of switch 29, the first left hand tongue and front contact of relay 39, the tongue and back contact of relay 41, the back contact and outer right hand tongue of a relay 42, through the coil of relay 33 to positive potential. Relay 23 subsequently operates and extends the above-mentioned circuit to the impulse unit 27, so that at the beginning of the next step impulse transmitted from the impulse unit, relay 33 will be operated. With the switch 29 in its "book" position the operation of relay 33 through its right hand tongues extends the circuits from the tongues of the "book" transmitter 11 to front contacts of relay 23 and since relay 23 is at this time operated, the circuits are extended through the plug and jack to the impulse unit 27 and reperforator 14 whereby the reperforator is operated in accordance with the code combination in the tape 22 at this time over the pins of "book" transmitter 11. Similarly relay 33 of the other control circuits associated with plugged up cord circuits are operated by step impulses from their associated impulse units 27 to effect transmission of the character in the "book" transmitter 11 to the circuits to which their plugs P are connected.

As the relay 33 of a control circuit, such as A, operates, its inner left hand tongue and front contact completes a circuit for holding the same operated through the coil of relay 41, the back contact and inner right hand tongue of relay 42 through the front contact and outer left hand tongue of relay 39 to ground. The above circuit, however, does not effect energization of relay 41 until the end of the step pulse which effected operation of relay 33, since the resistance of the coil of relay 41 at this time limits the flow of current in this circuit to some value below that necessary to operate relay 41. With relay 41 operated and locked up through the locking circuit which also maintains relay 33 operated, the next step impulse from the impulse unit 27 appearing on the tongue of relay 41 is extended through the front contact thereof and the coil of relay 42 to positive potential. This step impulse, therefore, effects energization of relay 42 which, in turn, opens the locking circuit of relays 41 and 33. Relay 42 when operated is locked up by a circuit extending through its coil, and the front contact of its inner left hand tongue to ground through the tongue and back contact of a relay 46. The release of relay 33 disconnects its cord circuit from the tongues of the "book" transmitter 11 and with relay 42 operated and locked up, further step pulses from the pulsing unit 27 will not be effective to re-energize relay 33 for the time being.

In a similar manner, all control circuits associated with cord circuits having plugs in jacks associated with idle sending circuits are operated by the first and second step pulses from their individual pulsing units to effect transmission to all such idle circuits of the character over the sensing pins in the "book" transmitter 11. Transmitters, such as 12 and 13, associated with cord circuits such as D and H are disassociated from their respective cord circuits by the energization of relays 47, the circuits thereto being completed upon the operation of switch 29.

If one of the jack circuits associated with the cord circuit over which it is desired to transmit the "book" message happens to be busy when the plug of a cord circuit is inserted therein, the seize relay 26 of such a cord circuit will not immediately operate. However, the cord circuit standby lamp 36 will be lighted and remain in this condition until its associated relay 26 operates to indicate to the operator that the cord circuit is at this time connected to an idle jack circuit. As described, the standby lamp 36 of each cord circuit that is plugged up, is illuminated on the plugging operation, and as soon as a jack circuit is seized, these lamps go out. Accordingly, when the standby lamps 36 of all the plugged up cord circuits go out, the operator knows that all such cord circuits are associated at this time with idle sending or jack circuits. Concomitantly with the operation of seize relays 26 of the plugged up cord circuits, relays 33 and 41 operate and release at the beginning of the first and second step pulses respectively. Relay 42 of each control circuit in the manner described operates at the beginning of the second step pulse and transmission of the first character in the "book" transmitter to all the sending circuits is completed when these relays operate. It will be noted that the sequence of operation of relays 39, 33, 41, and 42 for each control circuit is independent of each of the other control circuits since the operation for these relays is controlled entirely from step pulses derived from impulse units connected to respective cord circuits. After the above mentioned relays of each control circuit have gone through the described sequence of operation which results in the locking up of relays 42 and at which time the standby lamps 36 of associated cord circuits will be out, the start button 35 may be operated.

The operation of start button 35 completes a circuit through the coil of the so-called start relay 48, the lower contact and movable element of the start button and through a series arrangement of make contacts and outer left hand tongues of relays 42 of each control circuit or closed contacts 49 of operated cut-out keys 34 to ground at the last control circuit such as H. When a cut-out key 34 is operated, the circuit to its associated control circuit relay 39 is opened at contacts 37 and therefore the associated relays of such a control circuit will not go through the described sequence of operation. Either a cut-out switch 34 of each control circuit or its associated relay 42 must be operated whereby the outer left hand tongue shorts contacts 49 of its cut-out key before the start relay 48 can be energized. Hence operation of start button 35 prior to the operation of relays 42 associated with all plugged up cord circuits has no effect on start relay 48. The operation of start relay 48 establishes a locking circuit for itself to ground at the front contacts and the first right hand tongues of all operated relays 39. The operated ones of relays 39 are those associated with plugged up cord circuits having energized seize relays 26.

The operation of start relay 48 through its outer tongue and front contact establishes a circuit from potential through the coil of relay 46 to the upper contact of start button 35 so that when the start button is released, the said circuit is extended to ground through contacts 49 of operated cut-out keys 34 or front contacts and tongues of energized relays 42. Operation of relay 46 removes the ground from the locking circuit to all relays 42 whereupon the relays release and restore their associated control circuits to the condition they were in at the reception of the first step impulse. At the time of operation of relay 46, the circuit through the back contact and tongue of relay 44 parallel to the circuit through the back contact and tongue of relay 46 will be open since relay 44 will normally be operated at the time switch 29 is thrown to its "book" position. This circuit for operating relay 44 may be traced from positive potential through the coil of relay 44, one of the switch arms of switch 29, the tape lever contacts 32 which are assumed at this time to be closed, and through another switch arm 29 to ground.

On the restoration of the relays of the control circuits to the condition they were in at the time of reception of the first step pulse from the impulse units connected thereto, the sequence of operation of these relays will be repeated for each pair of succeeding step pulses and concomitantly therewith a character from the "book" transmitter 11 will be transmitted to their associated circuits.

When the switch 29 is in its "book" position, a circuit is completed from negative potential through the step magnet 31 of the "book" transmitter 11 to the front contact of the middle tongue of relay 48. The middle tongue of relay 48 is connected to ground through back stops and tongues of relays 33 and 39 of each controlled circuit in such a manner that the ground is not applied to this tongue of relay 48 unless either one or the other of relays 33 and 39 are deenergized. As will be recalled, relay 39 of each control circuit having its cut-out key unoperated is energized on the plugging up of the associated cord circuit. Hence, the circuit to the step magnet of the "book" transmitter includes a series circuit through the back contacts and tongues of relay 33 of all operating control circuits. The ground for this circuit is applied at the last control circuit, such as control circuit H of Fig. 3.

When the start relay 48 is first operated, relays 33 of operating control circuits will be in deenergized positions and, therefore, operation of relay 48 at this time completes the circuit to the step magnet 31 of "book" transmitter 11 to energize the same. As one of the relays 33 subsequently operates, the circuit to the step magnet 31 will be interrupted and during this time, in the manner set forth, the character over the pins is transmitted to all the connected sending circuits. Some time after the transmission of such a character, all the relays 33 will be deenergized concurrently to complete the circuit to the step magnet 31 for another cycle of operation thereof. Since the relays 33 are all energized at the beginning of step pulses from their individually connected impulse units 27 and deenergized at the beginning of a second impulse, it follows that the step magnet 31 is energized and goes through a cycle of operation once for each pair of step impulses from the impulse units 27. For each operation of step magnet 31, relays 33 of all connected control circuits have to go through their sequence of operation, and in this manner the stepping of the tape in the "book" transmitter is dependent upon step impulses from all the connected impulse units with certain exceptions hereinafter described.

As described, with the switch 29 in its "book" position, a circuit is established from ground through the tape lever contacts 32 of the "book" transmitter and coil of relay 44 to positive potential. Hence, when the tape 22 becomes sufficiently taut to open contacts 32, relay 44 is released. It is only the tape lever contacts 32 of the "book" transmitter that control the operation of relay 44 and with relay 44 deenergized, a ground is applied through the coils of relays 42 to maintain the same locked up, if in an energized condition, or to lock the same when they do become energized in the manner set forth. With relays 42 locked up, the operation of which occurs at the beginning of the second step pulse of each pair of step impulses, the first step impulse of succeeding pairs will not be extended to associated relays 33, as the circuits thereto will be open at the outer right hand tongues of relays 42. Hence, with relays 42 in this condition, further transmission from the "book" transmitter is for the time being halted.

The accumulation of more tape 22 to permit contacts 32 to close, effects energization of relay 44 to remove the ground from the locking circuits to relays 42, whereupon they release and restore associated control circuits to the condition that they respond to succeeding step pulses from associated impulse units to effect transmission of succeeding characters in the tape of "book" transmitter 11.

As will be noted, the circuit for the step pulse for all cord circuits with the exception of cord circuit A, associated with the "book" transmitter, extends through contacts of switch 29 in such a manner that the opening of the tape lever contacts of its associated transmitter has no effect thereon. Accordingly, the transmission through these other cord circuits is independent of the condition of associated tape lever contact such as 32. Furthermore, with the switch 29 in its "book" position the circuits to the step magnets of the transmitters of other cord circuits are opened and hence such magnets do not operate.

It sometimes happens that a tape tie-up occurs in the equipment to which the cord circuit is transmitting, such as in the reperforator 14 of a jack circuit. If such a condition does occur, it is desirous that further transmission thereto be stopped since the reperforator is in no condition to record further signals. A tape tie-up in a reperforator, such as 14, in accordance with the system disclosed in the Hoover Patent 2,252,852, causes the energization of a tape tie-up relay 28 of its connected cord circuit. The energization of relay 28 normally operates to open the circuit through one of the coils of the associated auto-control relay 25 and stops further transmission through the associated cord circuit.

With the switch 29 in its "book" position, a tape tie-up occurring on any of the circuits on which signals are being transmitted is effective on its associated control circuit in such a manner that transmission is halted only to the circuit wherein the tape tie-up exists and transmission is continued to the other connected circuits uninterrupted. If a tape tie-up occurs in the circuit to which a cord circuit such as D was transmitting, it would complete a circuit in the manner suggested above for the energization of its cord circuit relay 28. The coil of relay 38 of control circuit D is in parallel with that of relay 28 of cord circuit D with switch 29 in its "book" position, and hence relay 38 will become energized simultaneously with the energization of relay 28. The energization of relay 38 through its left-hand tongue and front contact short-circuits contacts 49 of its cut-out key 37 and therefore the circuit for energization of relay 46 will be independent of the condition of the cut-out switch of such a control circuit. Hence, the control circuit D will operate after the energization of relay 38 in the same manner as it would with its cut-out key operated to its cut-out position, and transmission of further signals from the "book" transmitter 11 to cord circuit D will be halted. The operation of relay 38 through its right hand tongue opens the circuit to its associated relay 39 so that further step pulses are not effective on this control circuit.

When the end-of-message signal is transmitted through the "book" transmitter 11, the same is effective on all the connected operating cord circuits in the manner pointed out in the Blanton patent to release seize relays 26 which, in releasing, apply a ground through the tongues and front contacts of relays 30 and 29 to battery through a disconnect lamp 51. The operator on observing the disconnect lamps 51 being illuminated is advised that the transmission of the "book" message to circuits associated with cord circuits having illuminated disconnect lamps 51, is completed and she may thereupon remove the associated plugs. Since transmission of the "book" message is halted through a cord circuit, when a tape tie-up occurs in the circuit to which it may have been sending, the seize relay 26 of such a cord circuit will not release to cause illumination of its disconnect lamp 51. Therefore, the operator seeing some of the disconnect lamps 51 illuminated and other disconnect lamps not illuminated, knows that the transmission of the "book" message has not been completed through one or more of these cord circuits which have unilluminated disconnect lamps. The operator may then proceed to have the cause of the trouble corrected and the untransmitted part of the "book" message sent to such circuits.

It may sometimes be desirous to transmit a "book" message to a number of circuits, one more of which may be in the process of having transmitted thereover an exceptionally long message. When a cord circuit is plugged up to a jack circuit having a long message transmitted thereover, the standby lamp 36 of this cord circuit will not go out. If it is desirous to begin transmitting to the other circuits without waiting for such a busy jack circuit to become idle, the operation of the cut-out key 34 of its associated control circuit permits transmission to the other idle connected circuits to be initiated by operation of the start key 35.

It will be noted with only the upper part 29a of switch 29 in its "book" position, the series circuits extending through control circuits such as A to D are grounded independently of the con-position. By also operating the lower part 29b of switch 29. Hence, with the arrangement shown, "book" messages may be transmitted to four sending circuits, or less, by operating only the upper half 29a of switch 29 to its "book" position. By also operating the lower part 29b of switch 29 to its "book" position, the "book" message may be transmitted through as many as eight cord circuits. Obviously, the same arrangement could be employed to add other groups of cord circuits to the "book" transmitter and all such groups may include more or less than four control circuits.

It will be obvious to those skilled in the art that various modifications of the invention may be made without departing from the spirit or essential attributes thereof and it is desired, therefore, that only such limitations be placed thereon as are specifically set forth in the appended claims.

What is claimed is:

1. In a telegraph system, a plurality of sending circuits, a plurality of tape transmitters each one of which is normally operative to transmit to any one of said sending circuits at a time individual character representing code groups of signals stored in associated control tapes, means for adapting one of said transmitters to transmit to a selectable plurality of said sending circuits code groups of signals stored in its control tape and means including independently operable devices of the selected ones of said sending circuits for transmitting the individual code groups to each one of the selected circuits within a given interval and with each code group transmitted to the circuits independently of the time of tranmission thereof to the others.

2. In a telegraph system, a plurality of sending circuits, a plurality of tape transmitters each one normally being operative to transmit to any one of said sending circuits at a time code groups of signals stored in associated control tapes, means for adapting one of said transmitters to transmit to a plurality of selected sending circuits code groups of signals stored in its control tape one group of signals at a time, individual timing means associated with each of said plurality of circuits and means including the timing means and circuits controlled thereby of the selected circuits to individually time the transmission of the individual code groups of signals from said single transmitter to said plurality of circuits.

3. In a telegraph switching system, a plurality of storage controlled message transmitting devices, an individual control circuit normally associated with each of said transmitting devices, a plurality of sending circuits, means including said control circuits for normally connecting any one of said transmitting devices individually to selected ones of said sending circuits and controlling the operation of said transmitting devices to transmit stored messages, means for disassociating all but one of said control circuits from respective transmitting device and associating the same with the one transmitting device having the non-disassociated control circuit, whereby said one transmitting device is connectable through a plurality of control circuits to a plurality of sending circuits to transmit signals thereover and means dependent upon a busy condition of one or more of said sending circuits to which said one transmitting device is connected to normally prevent transmission from said one transmitting device to all of said sending circuits.

4. In a telegraph switching system, a plurality of storage controlled message transmitting devices, an individual control circuit normally associated with each of said transmitting devices, a plurality of sending circuits, means including said control circuits for normally connecting any one of said transmitting devices individually to selected ones of said sending circuits and controlling the operation of said transmitting devices to transmit stored messages, means for disassociating in groups all but one of said control circuits from respective transmitting devices and associating the same with the transmitting device having the non-disassociated control circuit, whereby said one transmitting device is connectable through a plurality of control circuits to a plurality of sending circuits to transmit signals thereover, means to initiate transmission from said one transmitting device to all of the connected sending circuits and means controlled by a busy condition of one or more of said connected sending circuits to prevent operation of said last-mentioned means.

5. In a telegraph message switching system, a plurality of sending circuits, a transmitting device normally operative to transmit messages one at a time to any selected one of said sending circuits, manually operable means to condition said transmitting device to transmit a message concurrently to a plurality of said sending circuits, separate selecting means for selecting individual sending circuits for simultaneous transmission thereto of a message from said conditioned transmitting device and timing means individual to the selected sending circuits for determining the respective time of transmission thereto from said transmitting device of the separate code groups of said message.

6. In a telegraph system, a plurality of transmission circuits, a message transmitter for transmitting code groups of signals representing characters of a message, means for transmitting one code group of signals at a time from said transmitter independently to selected ones of said plurality of said transmission circuits and means individual to each of said sending circuits for preventing the transmission of a second code group to any one of said circuits until the transmission of the preceding code group to all of the selected circuits.

7. In a telegraph switching system, a plurality of sending circuits, a plurality of transmitting devices, means for normally associating any one of said transmitting devices one at a time with selected ones of said sending circuits, impulse generating means included in said sending circuits to normally initiate a transmitting device associated therewith into a cycle of operation for each one of a predetermined impulse generated thereby, means for selectively associating a predetermined one of said transmitting devices with a selected plurality of said sending circuits and means dependent upon a predetermined number of impulses from each of said selected plurality of sending circuits with which said predetermined transmitting device is associated to initiate said transmitting device into a cycle of operation.

8. In a telegraph switching system, a plurality of sending circuits, a transmitting device, means for simultaneously associating said transmitting device with selected ones of said sending circuits, impulse generating means included in said sending circuits to normally initiate the transmitting device associated therewith into a cycle of operation for each one of predetermined impulses generated thereby and means for controlling said transmitting device to be initiated into a cycle of operation in response to a plurality of said predetermined impulses from the impulse generating means of the associated circuit.

9. In a telegraph switching system, a plurality of sending circuits, a plurality of transmitting devices, means for normally associating any one of said transmitting devices one at a time with selected ones of said sending circuits, impulse generating means included in said sending circuits to normally initiate a transmitting device associated therewith into a cycle of operation for each one of predetermined impulses generated thereby, means for selectively associating a predetermined one of said transmitting devices with a plurality of said sending circuits, means controlled by a first one of said predetermined impulses from a generating means to condition said predetermined transmitting device to transmit a single code group to the associated sending circuit, and means controlled by the following one of said predetermined impulses from the generating means to uncondition said transmitting device for transmission to the associated circuit whereby a code group is transmitted to each of the associated sending circuits for each pair of said predetermined impulses from its associated generating means.

10. In a telegraph switching system, a plurality of sending circuits, a plurality of transmitting devices, means for normally associating any one of said transmitting devices one at a time with selected ones of said sending circuits, means for associating a predetermined one of said transmitting devices selectively with a plurality of said sending circuits for transmission thereover of the same message, a signal recording device in each of said sending circuits for recording signals transmitted thereto from a transmitting device, and means controlled by the failure of one or more of the recording devices to record signals transmitted over the associated sending circuit from said predetermined transmitting device to halt further transmission thereto while continuing transmission to the remainder of the circuits associated with said predetermined transmitting device.

11. In a telegraph switching system, a plurality of sending circuits, a plurality of transmitting devices, means for normally associating any one of said transmitting devices one at a time with selected ones of said sending circuits, means for associating a predetermined one of said transmitting devices selectively with a plurality of said sending circuits for transmission thereover of the same message, a signal recording device in each of said sending circuits for recording signals transmitted thereto from a transmitting device, means controlled by the failure of one or more of the recording devices to record signals transmitted over the associated sending circuit from said predetermined transmitting device to halt further transmission thereto while continuing transmission to the remainder of the circuits associated with said predetermined transmitting device, and means to indicate at the end of a message the circuits to which a complete message has been transmitted.

12. In a telegraph switching system, a plurality of sending circuits, a plurality of transmitting devices, means for normally associating any one of said transmitting devices one at a time with selected ones of said sending circuits, means for associating a predetermined one of said transmitting devices selectively with a plurality of said sending circuits for transmission thereover of the same message, a signal recording device in each of said sending circuits for recording signals transmitted thereto from a transmitting device, means controlled by the failure of one or more of the recording devices to record signals transmitted over the associated sending circuit from said predetermined transmitting device to halt further transmission thereto while continuing transmission to the remainder of the circuits associated with said predetermined transmitting device, indicating means associated with each circuit and means for controlling said indicating means to indicate the circuits having an inoperative recording device associated therewith.

WILLIAM B. BLANTON.
EDWARD J. AGNEW.

REFERENCES CITED

The following references are of record in the file of this patent:

UNITED STATES PATENTS

| Number | Name | Date |
|---|---|---|
| 1,658,516 | Daine | Feb. 7, 1928 |
| 1,749,444 | Rae | Mar. 4, 1930 |
| 1,888,267 | Hershey | Nov. 22, 1932 |
| 2,069,224 | Cummings | Feb. 2, 1937 |
| 2,116,372 | Weld | May 3, 1938 |
| 2,279,295 | Blanton | Apr. 14, 1942 |
| 2,293,704 | Blanton | Aug. 25, 1942 |
| 2,346,173 | Light | Apr. 11, 1944 |
| 2,365,750 | Dore | Dec. 26, 1944 |
| 2,376,111 | Bacon | May 15, 1945 |